INVENTORS:
Arno Finke
Herbert Reissner
By: Spencer & Kaye
Attorneys

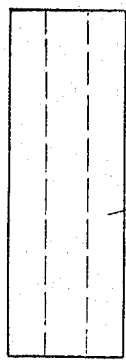
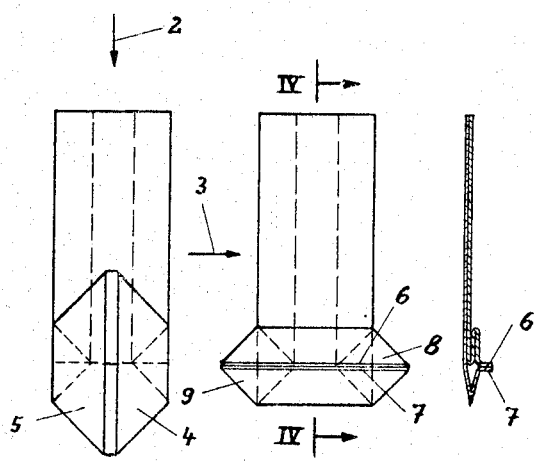
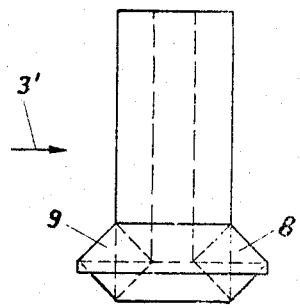
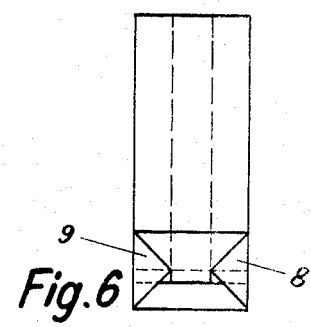
Fig.1 Fig.2 Fig.3 Fig.4 Fig.5 Fig.6
INVENTORS:
Arno Finke
Herbert Reissner Aug. 16, 1966    A. FINKE ETAL    3,266,387
METHOD AND MACHINE FOR MAKING BAGS
Filed Jan. 29, 1963    11 Sheets-Sheet 3

INVENTORS:
Arno Finke
Herbert Reissner

By: Spencer & Kaye
Attorneys

Inventors
Arno Finke &
Herbert Reissner
By Spencer & Kaye
Attorneys

Aug. 16, 1966  A. FINKE ETAL  3,266,387

METHOD AND MACHINE FOR MAKING BAGS

Filed Jan 29, 1963  11 Sheets-Sheet 11

Inventors
Arno Finke &
Herbert Reissner

By Spencer & Kaye
Attorneys

United States Patent Office 3,266,387
Patented August 16, 1966

3,266,387
METHOD AND MACHINE FOR MAKING BAGS
Arno Finke and Herbert Reissner, Lengerich, Westphalia, Germany, assignors to Windmöller & Hölscher, Lengerich, Westphalia, Germany
Filed Jan. 29, 1963, Ser. No. 254,818
Claims priority, application Germany, Oct. 16, 1962, W 33,136
49 Claims. (Cl. 93—22)

The present invention relates to a method and machine for making bags, more particularly, to a method and machine for making block-shaped bottoms on previously folded tubular sections.

There exists a method for making the block-shaped bottom on tubular sections which have inwardly directed longitudinal side folds. This is done by first making into a folded bottom a portion of the section whose length is equal to twice the depth of the side fold plus the desired width of the bottom seam, and then raising the resulting corner pleats and spreading them toward and over the side edges of the section so that the edges of the bottom opening lie against each other and thus stand upright with respect to the remainder of the section. These facing edges are then joined together, such as by "welding," to form the bottom seam, which itself is then folded over onto the bottom.

If, as was heretofore customary, the sections are moved continuously, the re-opening and spreading of the previously made folded bottom portion and particularly the formation of the seam make it mandatory either that the sections be carried along a long work path, which increases the over-all size of the machine, or that the sections be conveyed through the machine at a relatively slow speed, which reduces the efficiency of the machine.

It is, therefore, an object of the present invention to improve the above-described manufacturing method, and this is done by changing the direction in which the tubular sections are transported, after the bottoms have been folded and before the corner pleats are raised up, from longitudinal to transverse, the term "longitudinal," as used throughout the instant specification and claims, being intended to refer to the direction which extends parallel to the imaginary axis of the tubular sections, i.e., a direction coextensive with the general length of the sections, and the term "transverse" being intended to refer to the direction which is at right angles to the longitudinal direction. This overcomes the drawbacks of the heretofore known methods because the speed at which the sections are conveyed in transverse direction can be slower than that at which the tubes are conveyed in longitudinal direction, the reason for this being that the width of the sections is smaller than their length. According to the present invention, it is particularly expedient if the sections are moved continuously so long as they travel in longitudinal direction and intermittently so long as they travel in transverse direction so that the manufacturing steps carried out during the transverse movement can be done while the sections themselves are at rest. This is of particular significance, because if the individual devices which are used to form the bottom have to be mounted for movement with the sections, as is the case when the sections are moved continuously throughout their entire manufacture, they will of necessity be very complicated and expensive. This is avoided if the operating stages can do their work while the individual sections are not moving.

The present invention may be carried out with even greater efficiency if the tubular sections, after having had their bottoms first folded, are then passed on alternately to at least two transverse conveyers which operate in parallel with each other. The reason for this is that the sections can be fed in longitudinal direction at a relatively high rate, i.e., many sections per unit time, while the manufacturing steps to be carried out during the transverse conveying require relatively more time. Therefore, the inherently slower rate of the transverse feed does not reduce the over-all optimal utilization of so much of the machine which processes the sections while the same are conveyed in longitudinal direction.

According to another feature of the present invention, the bottom seam is folded in the direction in which the sections travel. As a result, the bottom of the flat bag will not be as thick as the bottom of a bag produced by heretofore known methods wherein the bottom seam is folded onto the bottom in a direction opposite to that in which the tubular section moves.

After the various steps carried out during the transverse movement have been completed, the sections are once again conveyed in longitudinal direction, the sections coming from the two parallel transverse conveyers being deposited alternately on a common receiving cylinder.

The present invention also includes the provision of a machine which is able to carry out the above-described process. Such a machine comprises, basically, conveyer means for conveying the tubular sections with their folded bottoms in longitudinal direction, suitable stop means for halting the oncoming sections, and transverse conveyer means extending at substantially right angle to the longitudinal conveying means, which transverse conveyer means are provided with chains equipped with suitable grippers for holding the sections so that the latter are moved past the operating stations at which the bottoms are re-opened, spread, and provided with the bottom seam.

Additional objects and advantages of the present invention will become apparent upon consideration of the following description when taken in conjunction with the accompanying drawings in which:

FIGURES 1, 2, 3, 4, 5, and 6 show the basic manufacturing steps of a bag bottom made according to the present invention, with FIGURE 4 being a sectional view taken on line IV—IV of FIGURE 3, the arrows between the figures indicating the direction in which the bag is moved from one manufacturing step to the next.

Figure 7:
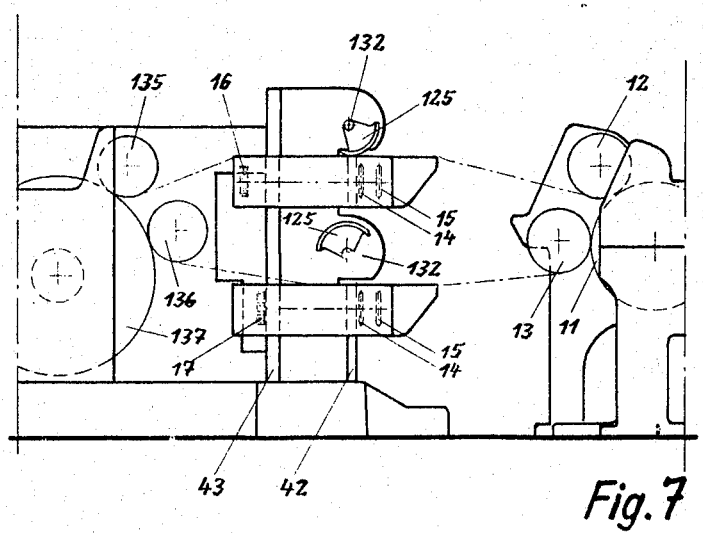
FIGURE 7 is a schematic side elevational view showing the improved component of a bag making machine according to the present invention.

Referring now to the drawings and to FIGURES 1 through 6 thereof in particular, the same show the various manufacturing steps for making a bag in accordance with the present invention.

The paper web from which the bags are to be made is stored on a supply roll, from which the web is unwound. The unwinding device is not shown because it is of conventional structure; see, for example, U.S. Patent No. 634,102. The web is fed to a device for making a tubular strip having inwardly folded longitudinal sides; the device which continuously makes such tubular stripping from the initially flat web is likewise conventional and therefore not shown. Finally, the folded stripping is cut into individual tubular sections 1, shown in FIGURE 1. Again, the cutting device by means of which the tubular stripping is cut transversely is of conventional arrangement and hence not described.

The tubular sections 1 are continued to be transported in their longitudinal direction, in the direction of arrow 2, during which movement the leading end is opened and then flattened so as to assume the configuration shown in FIGURE 2 in which the corner folds or pleats are indicated at 4 and 5. This operation is likewise conventional; see, for example, U.S. Patent No. 2,324,358. As is well known in the art, the portion of the section which is involved in the making of the bottom is equal in length to twice the depth of the side folds plus the desired width of the bottom seam to be formed.

According to the prior art, the operation proceeds, from this point, by folding and gluing the bottom flaps. According to the present invention, however, the tubular section having the configuration shown in FIGURE 2 is moved, to subsequent operating stations, transversely to its length in the direction of arrow 3. At the first of these stations, the corner pleats 4, 5, shown in FIGURE 2, are opened in a direction transverse to the length of the tubular section and are completely spread, i.e., the pleats are raised and spread toward and over the side edges of the section, thereby forming upstanding bottom edges 6, 7 as shown in FIGURES 3 and 4 (see particularly the latter which depicts the upstanding edges 6, 7) and triangular pockets 8, 9, which project beyond the edges of the tubular section. The sections are moved from the spreading device, still in a direction transverse to the length of the tubular section as indicated by arrow 3, to the next operating station at which the edges 6, 7, which stand upright with respect to the remainder of the section are firmly joined to each other, such as by "welding" under heat and pressure. From this welding station, the tubular section, whose bottom seam is now sealed, is moved still in transverse direction as shown by arrow 3', to the next operating station at which the seam constituted by the joined together and upstanding edges 6, 7, is folded forwardly upon the bottom so that the tubular section will be as shown in FIGURE 5. The section is then moved, by a continuously driven conveyer, in longitudinal direction of the section as indicated by arrow 10 until it reaches another operating station which folds the triangular pockets 8, 9, back over the bottom, as shown in FIGURE 6. Prior to this last-mentioned folding step, which can be carried out by means of conventional baffles, small amounts of an adhesive will have been applied to the bag so as to hold the pockets 8, 9, in their folded-over positions.

It will be seen from the above that a completed block-shaped bag will thus have opposite front and rear panels (which, during the manufacturing process, are flat), two opposite side panels (which, during the manufacturing process, are the inwardly folded longitudinal sides), and a folded bottom. This bottom is constituted by what are, in effect, prolongations of the various panels which prolongations themselves terminate in the edge portions 6, 7, that are joined together in a seam. This seam, may, as best seen from FIGURE 3, be deemed as being composed of a center part represented by the edge portion of the prolongations of the front and rear panels and two side parts, one of which side parts is constituted by the doubled-over edge portion of the prolongation of one side panel and the other of which side parts is constituted by the doubled-over edge portion of the prolongation of the other side panel. When the bag is erected, the prolongations of the front and rear panels together constitute the bottom surface seen when looking through the top of the bag. The center part of the seam is folded to the underside of the prolongation of either the front or rear panel, depending on the point of reference (see FIGURE 5). The prolongations of the side panels each form a triangular pockets 8, 9, which itself is provided with one of the side parts of the seam (FIGURE 5). As best seen from FIGURE 6, each triangular pocket, together with its side part of the seam, is folded to the center part of the seam and to the prolongations of the front and rear panels.

In practice, it will be expedient to apply a bottom patch to the bag after it has been given the configuration shown in FIGURE 6; this can be done by conventional machinery such as is shown, for example, in U.S. Patent No. 2,231,051.

It would be possible to move the tubular sections in transverse direction in a continuous manner, but this would require complicated and expensive devices which, in order to be able to carry out the individual operations, would have to be movable together with the sections. According to the present invention, therefore, the transverse conveying is carried out intermittently, i.e., in a stepwise manner, so that the manipulative steps, e.g., the spreading of the triangular pockets and the joining of the edges 6, 7 can be performed while the tubular section being worked on is at a standstill.

The efficiency of the machine can be improved by providing two transverse operating paths and by feeding the tubular sections with the made up folded bottoms (FIGURE 2) alternately to the two paths. This allows the machine as a whole to be used with maximum efficiency because the bottoms of the longitudinally travelling sections can, by means of known working cylinders, be folded faster than the above-mentioned manipulative working steps can be carried out during the transverse movement. After the sections have been worked on during the transverse feed, they will again be combined for movement along a common work path (beginning with the bag as shown in FIGURE 5), because the triangular pockets can be folded, and the bottom patch be applied, at the same speed as that at which the sections were processed to assume the configuration shown in FIGURE 2. In this way, the output of the machine can be doubled without it being necessary to reduce the amount of time available for spreading the triangular pockets and welding the upstanding edges together.

Figure 8:
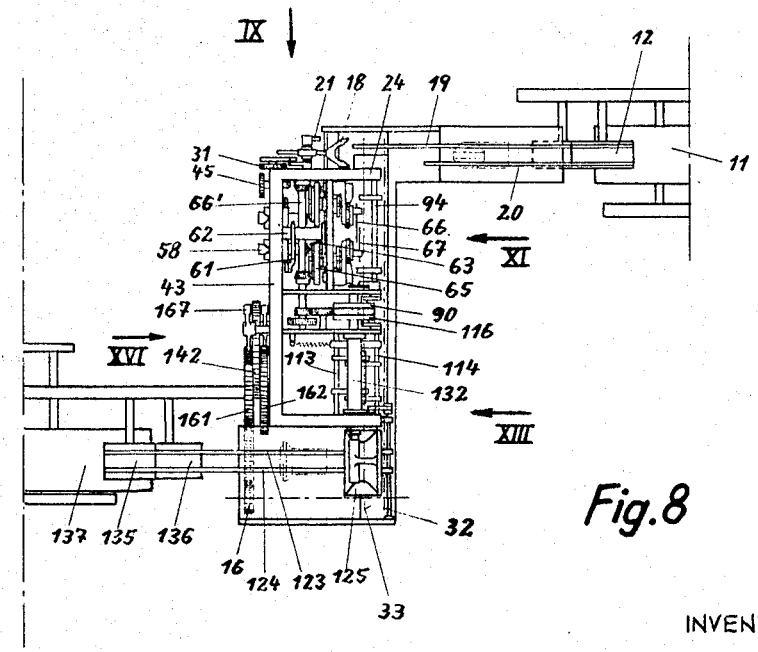
FIGURE 8 is a plan view of the structure shown in FIGURE 7.

FIGURES 7 and 8 are schematic representations of a machine according to the present invention in which there are two parallelly operating transverse feeds each of which spreads and subsequently welds the tubular sections which it processes. After the tubular sections have had their leading ends opened and folded to assume the configuration shown in FIGURE 2, they are delivered by a cylinder 11 to one of two directing cylinders 12, 13, which send the sections along their further respective paths. The transfer system to which the cylinders 12, 13 belong is so arranged that the sections are taken up by the cylinders 12, 13 alternately. This is done, for example, by equipping the cylinders 12, 13 with suitable suction devices capable of holding the sections to the periphery of the respective cylinder, the suction devices being so controlled that the sections are, as mentioned above, picked up alternately by the two cylinders. Each directing cylinder 12, 13 feeds the sections which it picks up to four endless conveyor belts, the latter being arranged to work in pairs so that each section is gripped between two pairs of belts, each pair being located near one of the two longitudinal edges of the section. FIGURE 8 shows the two upper conveyer belts 19, 20 pertaining to the cylinder 12, while in FIGURE 7 the paths along which the pairs of belts feed the tubular sections are shown in phantom lines only. As is apparent from FIGURE 7, the two feed paths are located one above the other. Each transverse feed device comprises two endless chains running over suitable sprocket wheels, including a pair of driving sprockets 14, 15 driven, as shown in FIGURE 7, by gears 16, 17, respectively. The two transverse feed devices as well as the working or operating stations along the superposed feed paths are similar to each other so that, for purposes of simplicity, it will suffice if, by way of example, only the upper one of the two will be described in detail.

The tubular sections taken over by the two pairs of conveyer belts 19, 20 (FIGURE 8) pertaining to the upper directing cylinder 12 are moved along, first by both pairs of conveyer belts and thereafter by but the pair 19, in the longitudinal direction of the sections until they reach a stop 18. The conveyer chains serving as the transverse feed are operated intermittently, i.e., in a stepwise manner, and take the oncoming section from the stop 18. Such a tubular section, on its way toward the stop 18, is shown, in FIGURE 8, in phantom lines.

Figure 9:
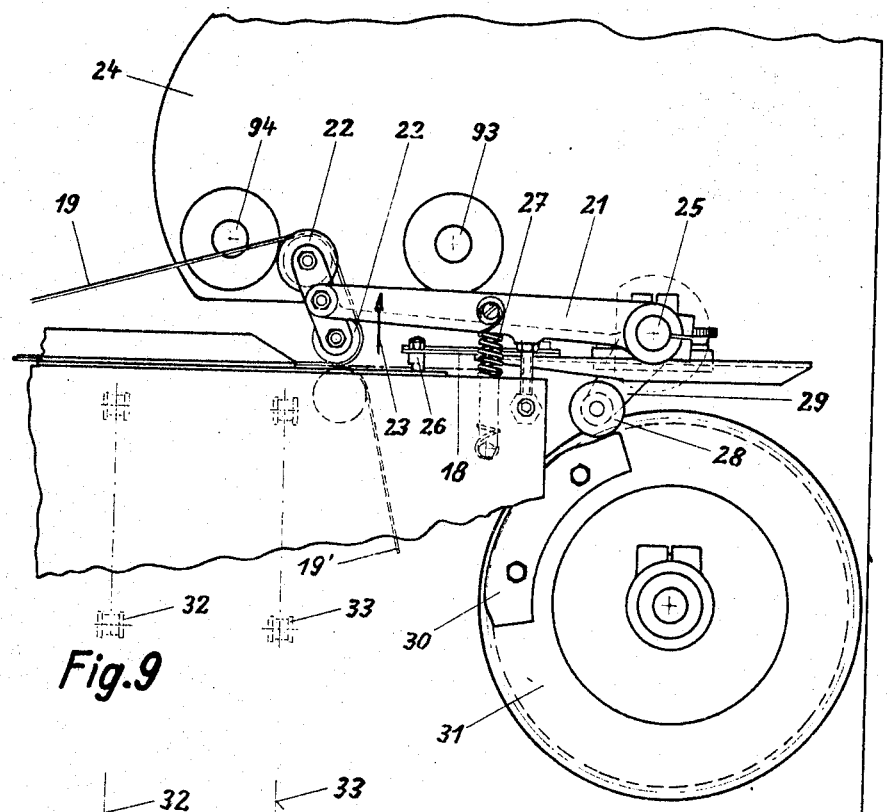
FIGURE 9 is an elevational view, on an enlarged scale, of the structure of FIGURE 8 as viewed in the direction of arrow IX.
Figure 10:
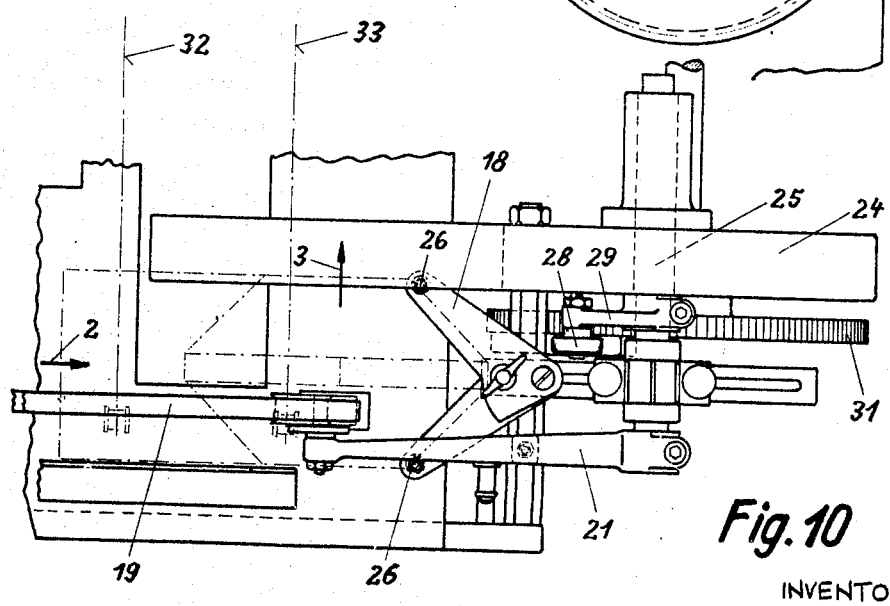
FIGURE 10 is a plan view of the structure shown in FIGURE 9.

FIGURES 9 and 10 show the stop 18 on an enlarged scale. The two conveyer belts 19, 19', constituting one of the pairs of belts, reach far enough so that they are effective to a point in the vicinity of the stop 18 (see also FIGURE 8). In order that the tubular section, shown in phantom lines and fed in longitudinal direction indicated by arrow 2, is freed so that it can be taken over by the transverse feed device, the end of belt 19 is run over guide rollers 22 carried at the free end of a lever 21 which is mounted on an axle 25, the latter being pivotably journalled in a part 24 of the machine frame, so that when the lever 21 pivots in the direction indicated, in FIGURE 9, by arrow 23, the end of conveyer belt 19 is lifted.

The stop 18 is bifurcated in the direction facing the oncoming sections and carries, at the forward ends of its arms, two pins 26 which are engaged by a section brought to the stop by the conveyer belts 19, 19'. The engagement of the sections with the pins 26 will cause the sections to become aligned so that they will always be taken over by the transverse feed at exactly the same point. Inasmuch as the leading end of the tubular section is pointed and inasmuch as this pointed end runs in between the two pins 26, the stop 18 has to be raised in order that the section may be released and be taken over by the transverse feed. Accordingly, the above-described axle 25 carrying the lever 21 also carries the stop 18. In order to adapt the stop to bag bottoms of different widths, the stop is made adjustable in longitudinal direction of the sections. The lever 21, and consequently the stop 18 as well, are held in rest position by means of a tension spring 27. The lever 21 and stop 18 are raised, i.e., pivoted in the direction of arrow 23 against the force of spring 27, when a roller 28 which is carried by a lever 29 that itself is fixedly attached to axle 25, is engaged by a peripheral cam 30 screwed to a gear 31, the latter rotating in synchronism with the operation of the bottom making machine as a whole. In FIGURES 8, 9, and 10, the chains 32, 33, constituting the upper transverse feed device, are shown in phantom lines.

The pairs of sprocket wheels 14, 15, which drive the chain pairs 32, 33, are themselves driven intermittently, in the manner which will be described below. The idler sprocket wheels at the other end of the chains are mounted in spring bearings which maintain the chains under tension. Each chain pair 32, 33 has a length which is a multiple of the length which the transverse feed is to move each tubular section during each cycle of the operation, and carries shafts 34 (FIGURES 11 and 12) which are spaced equidistantly from each other. So much of the structure which, in FIGURE 12, pertains to the transverse feed drive, is taken along line a—a of FIGURE 11. A pair of grippers 35, 36, and a lever 37 are non-rotatably mounted on each shaft 34. The lever 37 carries at its free end a roller 38 and is held in its rest position by means of a torsion spring 39. The grippers 35, 36 are in the gripping position when the lever 37 is in its rest position. A link element 41, which is controlled by a cam disc 40, engages the roller 38 so as to pivot the lever 37, thereby opening the grippers 35, 36. The cam disc 40 is fixedly mounted on a shaft 44 which itself is rotatably mounted in the front wall 42 and the rear wall 43 of the machine frame. As shown in FIGURE 12, the right-hand end of shaft 44 which projects beyond the rear wall 43 of the machine carries a gear 45 which drives the shaft in synchronism with the operation of the machine.

Figure 11:
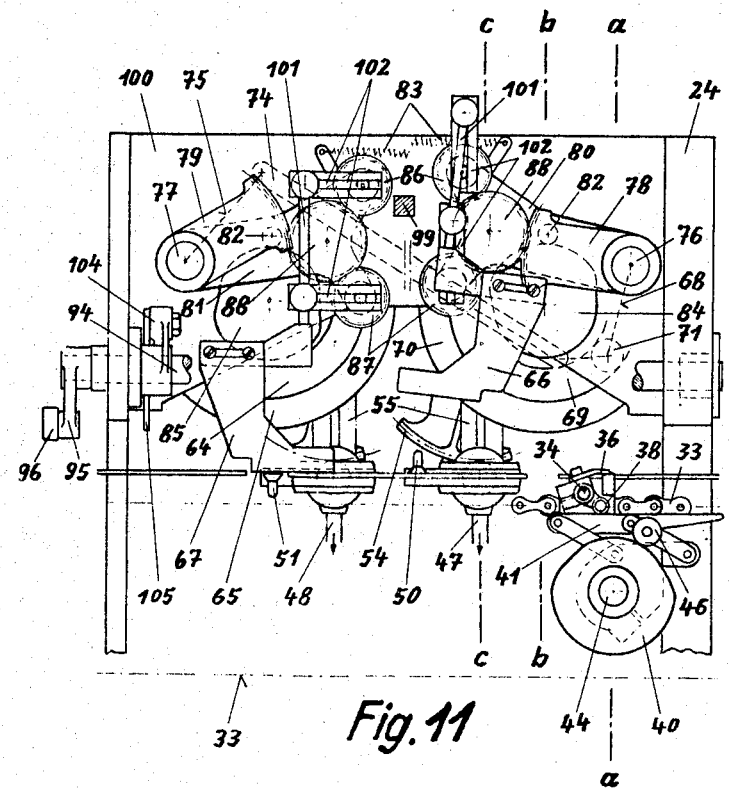
FIGURE 11 is an elevational view, on an enlarged scale, of the spreader device shown in FIGURE 8 as viewed in the direction of arrow XI.
Figure 12:
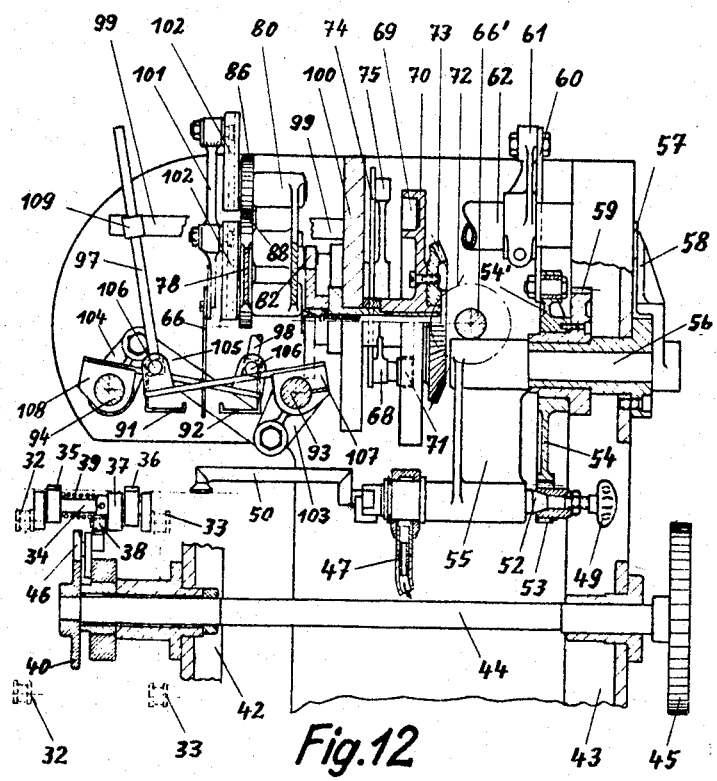
FIGURE 12 is a side elevational view of the structure shown in FIGURE 11, taken variously along section line a—a, b—b, and c—c of FIGURE 11, as will be explained below.

With the parts in the transfer position shown in FIGURE 11, the grippers 35, 36 are at first closed. The grippers are then opened when the transverse chain drive is at rest; this occurs when a roller 46 is engaged by and runs onto an arcuate section of the cam disc 40 which is of enlarged radius, thereby raising the link element 41. When the grippers are opened the conveyer belts 19, 19' (FIGURES 8, 9, and 10) bring a tubular section to the stop 18. The arrangement of the parts is such that the inner longitudinal edge of the section runs into the grippers so that this edge is gripped by the grippers when the latter are closed. The stop 18 and the conveyer belts 19, 19', then release the section, in the manner described above, and the transverse feed drive is advanced one step, i.e., one cycle, so that the section is passed on to the spreading device.

The spreading devices in the upper and lower transverse feed paths lie in the region indicated, in FIGURE 8, by arrow IX. FIGURES 11 and 12 will again show only the upper spreader device, the lower spreader device being smaller to its counterpart in the upper feed path. In FIGURE 11, the right half of the spreader is shown with the parts occupying their respective rest positions, while the left half shows the parts in their final working or operative position. The two positions are end or limit positions, with the parts being moved between these two positions. It is expressly pointed out that the two halves of FIGURE 11 show the parts in different operative positions only so as to facilitate the illustration of these positions; in actual operation both halves will, of course, work in synchronism and will at all times occupy the same operative position.

The spreader includes, firstly, means for re-opening the previously folded flaps 4, 5 (see FIGURE 2) of the section, these means being constituted by suction elements such as cups 50, 51 (FIGURE 11). The cup 51 is shown in its rest position in which it lies below the horizontal plane in which the section is being conveyed, while the cup 50 is shown in the operative position it occupies at the beginning of the re-opening of the previously opened and then folded end of the section. The axle 52 with which each respective cup pivots carries a gear 53 which is in mesh with a toothed segment 54. So much of FIGURE 12 which pertains to the means for re-opening the folded end of the sction is taken along line c—c of FIGURE 11. Suction cups 50 and 51 are connected, via respective conduits 47, 48, to a suitable vacuum pump (not shown), there being appropriate flow control elements (not shown) incorporated in the conduits. Each axle 52 is supported by a lever 55 which itself is keyed onto an axle 56. The toothed segment 54 is carried on axle 56 so as to be freely rotatable thereon but axially immovable with respect thereto. Each lever 55 can be turned into a position proper for the width of the particular sections being handled, the angular position of each lever 55 beng indicated by an indicator 58 (see also FIG- URE 16) which cooperates with a scale 57 mounted on the rear wall 43 of the frame. After the keyed connection between each gear 53 and the axle 52 upon which it is mounted is released, each of the axles 52 can be rotated relative to the respective toothed segment 54 by means of a respective knob or hand wheel 49. In this way, the suction cups 50, 51, can be adjusted; if desired, it is possible, at the same time, to shift their eccentricity. The keyed connection between the axles 52 and gears 53 is then restored.

Each toothed segment 54 has a toothed segment 59 screwed to it. The toothed segments 54 of the two suction cups 50, 51 are operatively associated with each other via the meshing toothed segments 59. The toothed segment 54 shown in section in FIGURE 12 and serving to pivot the suction cup 50 is provided with a short lever arm 54', the latter having hingedly connected to it a link element 60. This link element 60 serves to actuate the toothed segment 54 to which it is connected and, via the cooperating segments 59, the other toothed segment 54 as well. The other end of link element 60 is hingedly connected to the free end of a lever 61 which is fixed to a shaft 62. This shaft also carries a lever 63, shown in FIGURE 8, carrying at its free end a roller which runs in a cam groove 64 (FIGURE 11) of a rotor 65 rotating in synchronism with the operation of the machine. The rotor 65 is driven by a shaft 66' via a pair of bevel gears (FIGURE 8). Thus, when the axles 52 are rotated by means of the toothed segments 54, which themselves are under the influence of the rotor 65, as described above, the suction cups 50, 51 (FIGURES 11 and 12) are brought into contact with the corner flaps 4, 5 (FIGURE 2); the cups hold these flaps and, upon being rotated back, lift them up.

Two spreaders 66, 67 (FIGURES 8, 11, and 12) then reach into the end of the tubular section which has been re-opened in the manner described above. The spreaders are constituted by flat plates which are mounted for movement in a given vertical plane extending in the transverse direction in which the sections are being conveyed, and are adjustable so as to enable them to handle bags and bottoms of different width. The spreaders 66, 67 are controlled by a pivoting lever, indicated schematically in FIGURE 11 at 68, which lever 68 carries a roller 71 running in a cam groove 69 of a rotor 70. So much of the structure which pertains to the spreaders and the drive therefor is taken along line b—b of FIGURE 11. The rotor 70 is driven, in a manner similar to that in which rotor 65 is rotated, from the shaft 66' via a pair of bevel gears 72, 73 (FIGURE 12), so that rotor 70 is likewise driven continuously in synchronism with the operation of the machine. A lever 75, shown schematically in FIGURE 11, is connected to lever 68 via a link element 74. The levers 68, 75, are mounted on axles 76, 77 (FIGURE 11), respectively. The axles 76, 77 carry toothed segments 78, 79, respectively, the latter being fixedly mounted on their respective axles. The axles 76, 77 also have levers 80, 81, respectively, rotatably mounted thereon. Each lever 80, 81 carries a roller 82, there being a spring 83 common to the two levers 80, 81 which spring presses the rollers 82 against respective cam discs 84, 85. The cam disc 85 is non-rotatably connected with rotor 65 and the cam disc 84 is non-rotatably connected with rotor 70. Each lever 80, 81 carries two gears 86, 87 which, via intermediate gears 88 also mounted on the respective levers 80, 81, engage the respective toothed segments 78, 79. Each pair of gears 86, 87 constitutes part of a link-type drive whose links 101 carrying the spreaders 66, 67, respectively, are connected, via respective cranks 102, with the gears 86, 87 as shown in FIGURE 11. The effective radius of the cranks can be adjusted by loosening the pins which carry the links 101 and pass through the cranks 102, thereby allowing each link 101 to be shifted along the length of the two cranks 102, on which it is mounted.

The gears 86, 87, in addition to their being rotated by the toothed segments 78, 79, respectively, are given an additional rotary movement by the pivotal movement of the levers 80, 81, respectively, this additional rotary movement being dependent on the cam discs 84, 85, respectively.

The cam discs 84, 85 are so adjusted with respect to the rotor 70 that, in order to move the spreaders out of their rest position (this being the position occupied by spreader 66 in FIGURE 11) and into their working position (this being the position occupied by spreader 67 in FIGURE 11), the levers 80, 81 are first caused to pivot downwardly, this being effected by letting the rollers 82 carried by levers 80, 81 run along the cam discs 84, 85 from a portion of larger radius onto a portion of smaller radius. At the same time, the rotation of the intermediate gears 88, which are in mesh with the toothed segments 78, 79, the latter, at this time, still being stationary, brings about a corresponding rotation of the gears 86, 87 so that the spreaders 66, 67 carry out a motion composed of the superposition of both of the above-described movements. This movement brings the spreaders into the re-opened end of the tubular section being worked on, in the course of which movement the edges of the section will come to lie in the recesses which are cut out of the outer lower corner of each spreader 66, 67. The toothed segments 78, 79 will then swing upwardly under the influence of the roller 71 running in cam groove 69, so that the gears 86, 87 will rotate through a further angle of 90°, thereby causing the spreaders 66, 67 to move downwardly and outwardly, following an arc having the radius of the cranks 102. In this way, the spreaders will follow what is, for all practical purposes, precisely the same path as do the portions of the section bottom during the spreading and folding. Upon completion of the spreading operation, the spreaders are moved back from their working position to their rest position in the opposite manner.

After the spreading operation, the folded bottom of the tubular section is acted upon by a plier-like neatening tool having jaws 91, 92 (FIGURE 12) of U-shaped cross section and arranged on opposite sides of the plane in which the spreaders 66, 67 move which neatening tool is controlled by a further cam disc 90 (FIGURE 8). This tool 91, 92 is used to make certain that the up-standing edges 6, 7 (FIGURES 3 and 4) will come into neat face-to-face engagement and that remaining portions of the flaps will be pressed down so as to lie flat. The tool also serves as a guide which assists in the further conveying of the section. One jaw 91 of the tool receives its motion from a shaft 93 and the other jaw 92 receives its motor from a shaft 94 (FIGURE 12). The shaft 94 carries a lever 95 (FIGURE 11) which carries at its free end a roller 96 that engages a cam disc 90 (FIGURE 8). As shown in FIGURE 12, the shafts 93, 94 are connected to each other via levers 103, 104 fixedly mounted on the respective shafts, and a link element 105 interconnecting the levers 103, 104. The jaws 91, 92 are moved in a direction parallel to themselves. This parallel movement is brought about as follows: each jaw is pivotably held by a respective one of levers 107, 108 which themselves are non-rotatably mounted on the shafts 93, 94, respectively, each of which shafts has its axis located on the side of the spreader plane which is opposite to the side on which the respective neatening jaw is located. The levers 107, 108 have bearings at their free ends to which the jaws are pivotally connected by means of pins 106. The jaws are fixedly connected to the ends of guide rods 97, 98, respectively, the latter being slidably received in respective sleeves 109 (only the sleeve for guide 97 is shown in FIGURE 12) so that the guide rods may reciprocate in their axial direction. Each sleeve 109, in turn, is mounted on a carrier 99 which is secured to an intermediate wall 100 of the machine, each sleeve 109 being pivotable about an axis which is parallel to the shafts 93, 94. For the sake of simplicity, the neatening tool and its guide means are not shown in FIGURE 11.

Figure 13:
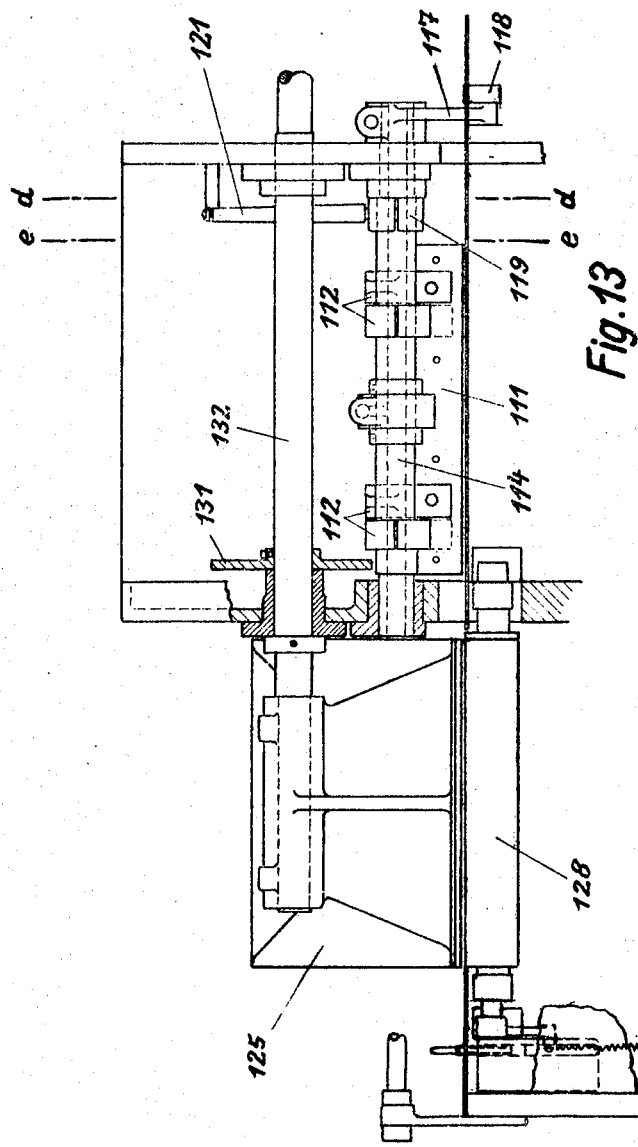
FIGURE 13 is an elevational view, on an enlarged scale, of a welding device and a bag transfer device following the welding device, as viewed in the direction of arrow XIII of FIGURE 8.
Figure 14:
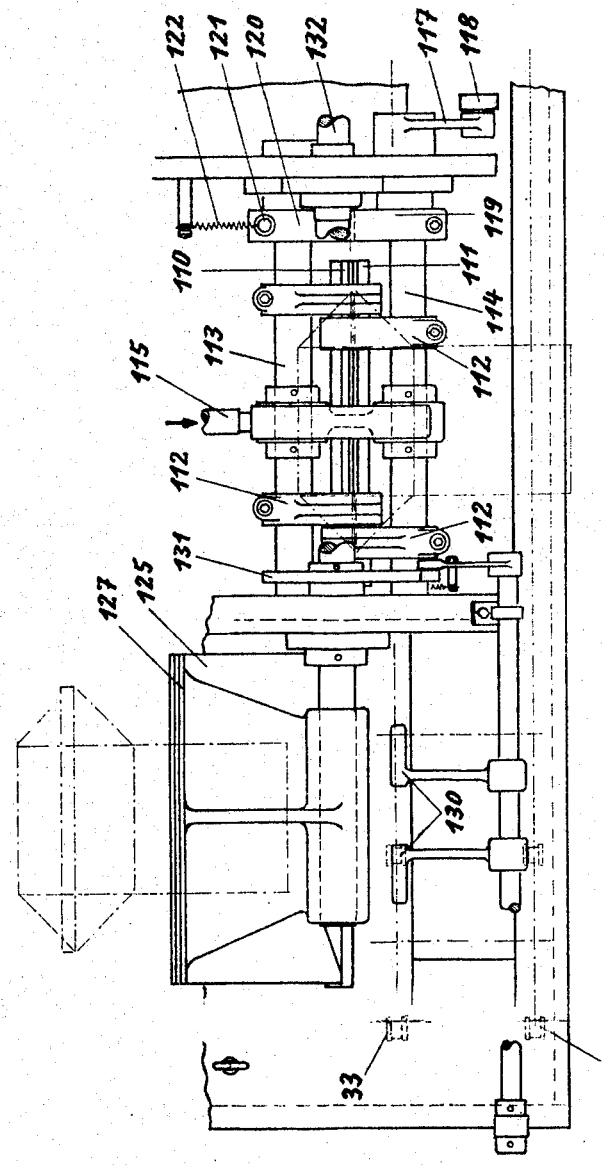
FIGURE 14 is plan view of the structure shown in FIGURE 13.
Figure 15:
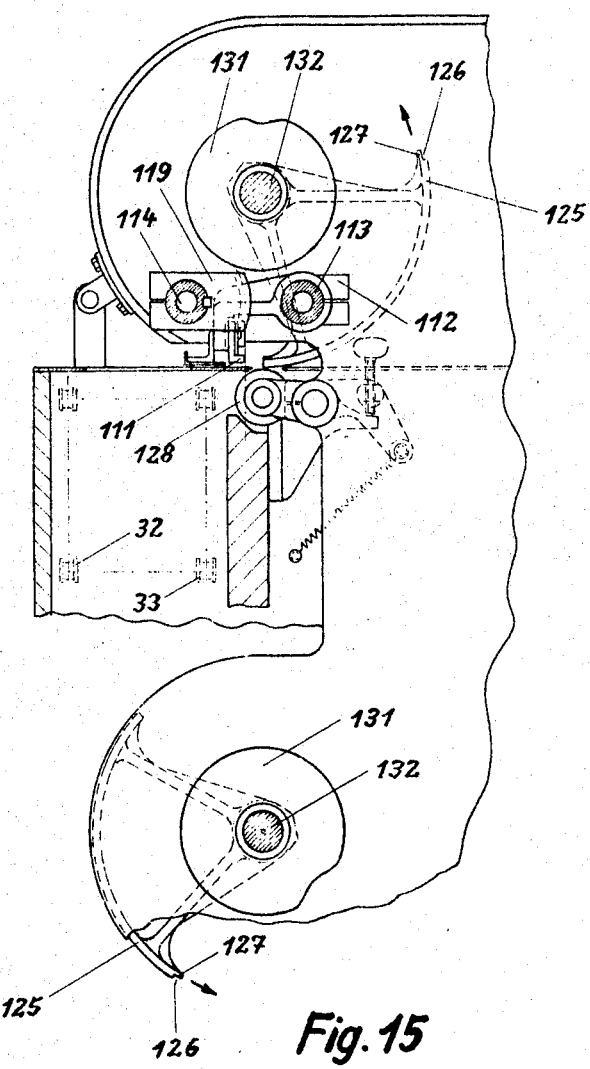
FIGURE 15 is a side view of the structure shown in FIGURE 13, but extended somewhat in downwardly direction and taken variously along section line d—d and e—e of FIGURE 13, as will be explained below.

The tubular section is next conveyed from the spreading device to the welding device. The latter is located in the region indicated, in FIGURE 8, by arrow XIII. FIGURES 13 through 15 again show, on an enlarged scale, only the upper one of the two welding devices pertaining to the upper and lower transverse feed paths, the upper left portion of FIGURE 15 being taken on line d—d and the upper right portion on line e—e of FIGURE 13. The welding device comprises a welding tongue having jaws 110, 111 (FIGURE 14). Each jaw is carried by two levers 112 which are fixedly mounted on two hollow shafts 113, 114, respectively. A coolant is introduced into the two hollow shafts by means of a conduit 115. The welding tongue is controlled by a cam disc 116 (FIGURE 8) which engages a roller 118 carried at the free end of a lever 117 which itself is fixedly mounted on the shaft 114 (FIGURES 13 and 14). The two shafts 114, 113 are operatively connected to each other via two meshing toothed segments 119, 120. The toothed segment 120 carrier a rod 121 whose free end is engaged by a tension spring 122 (FIGURE 14); the cam disc 116 acts against the force of spring 122 to hold the welding tongue normally in its open position. It is when the welding tongue is in this open position that the tubular section is fed to it by means of the transverse conveyer chains, the arrangement being such that the upstanding edges 6, 7 (FIGURES 3 and 4) run in between the jaws. As soon as the transverse feed and consequently the tubular section comes to rest, the welding tongue is closed under the influence of the cam disc 116 and the edges 6, 7 are welded to each other under the influence of heat and pressure. The jaws 110, 111 of the welding tongue are continuously heated by suitable means (not shown). The welding temperature is very precisely controlled by means of a loop-type regulator.

After the welding tongue is opened, the transverse feed device, during the next cycle, moves the tubular section whose edges 6, 7 have now been welded together but which still stand at right angles to the rest of the section, on to the bag transfer device whereat the section is first exposed to a rotating hollow cylinder segment 125 (FIGURES 7, 8, 13–15). The leading end of this segment 125 is provided with a recess 126 (FIGURE 15), which leaves a projection 127 that serves to fold over the welded together edges 6, 7, before the bottom of the section is wedged between the segment 125 and a resilient supported counter roller 128. In this way, the welded bottom seam is folded over onto the bottom after the section has come to rest after having been moved transversely for the last time. As the segment 125 continues to rotate, the section is once again transported in its longitudinal direction and is fed to continuously moving endless belts 123, 124, working in pairs (FIGURE 8).

The grippers 35, 36 (FIGURES 11 and 12) release the section before the bottom comes into contact with the segment 125. The grippers release the section in a manner opposite to that in which they first gripped it. This requires a device for opening the grippers against the action of the torsion springs 39, which device is similar to the one described above in connection with FIGURES 11 and 12. In order to make certain that the section is held in proper place, the same is held by means of a holder 130 (FIGURE 14) which becomes effective before the grippers release the section. The holder 130, which is controlled by a cam disc 131 mounted on a shaft 132 carrying the segment 125, holds the section until the same is gripped between the segment 125 and the counter roller 128 which, as described above, transport the section in longitudinal direction.

The conveyer belts 123, 124 move the section, along the paths shown in FIGURE 7 in phantom lines, to the cylinders 135, 136. FIGURE 8 shows a tubular section in phantom lines, this section being on its way to the cylinder 135. The cylinders 135 and 136 feed the sections to a common receiving cylinder 137, the latter being equipped, in conventional manner with grippers which grip the leading end of the tubular section. The triangular pockets 8, 9 (FIGURE 5) of the bag, which still project laterally beyond the sides of the section, have small quantities of adhesive applied to them by means of conventional adhesive applicators. These triangular pockets are then folded over, again by conventional baffles, so that these pockets will become part of the bottom of the bag, as shown in FIGURE 6. Finally, a bottom patch is applied to the bag, the means for doing this once again being conventional. The grippers of the receiving cylinder 137 then deposit the finished bags, in upright position, on a receiving table from which they can be removed in stacks containing the desired number of bags.

Figure 16:
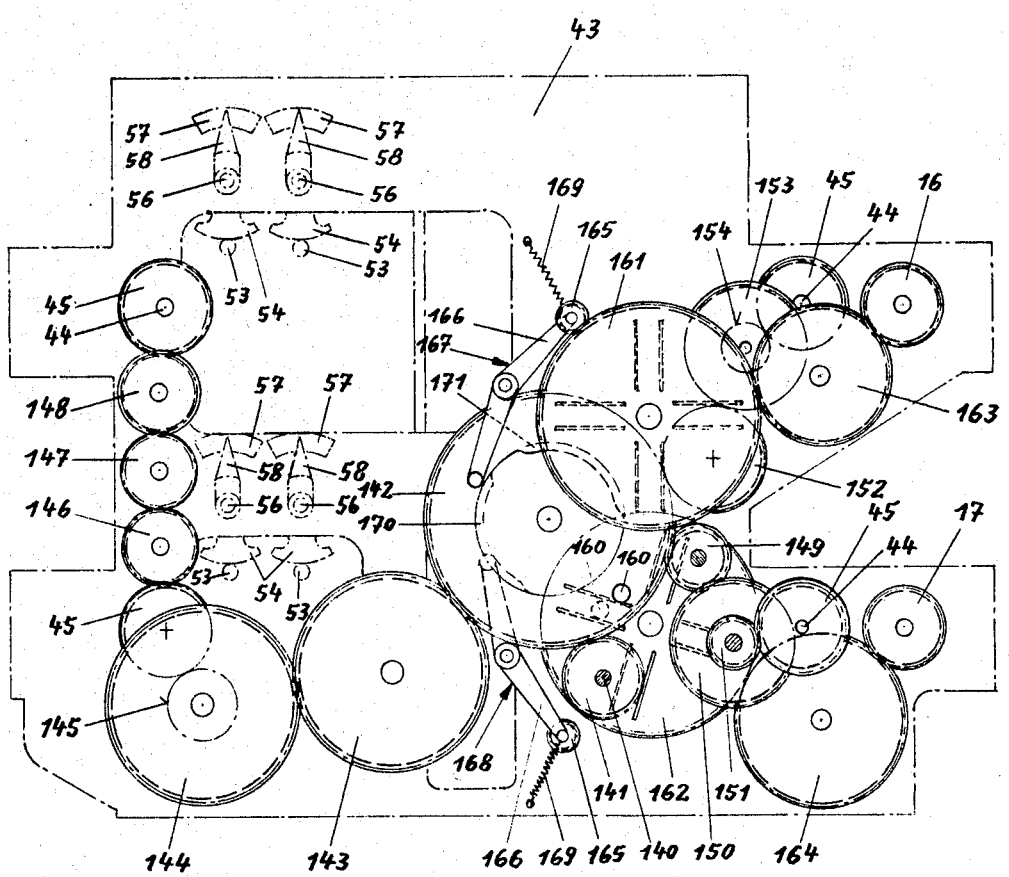
FIGURE 16 is an elevational view, on an enlarged scale, showing the machine drive as viewed in the direction of arrow XVI of FIGURE 8.

FIGURE 16, taken in the direction of arrow XVI of FIGURE 8, shows the drive for the two transverse conveyers and the cam discs for opening the grippers at the two ends of the chains. The power input shaft 140 is driven by a main drive (not shown). The shaft 140 carries a pinion 141 which is in mesh with a relatively large gear 142. The gear 45 is driven via gears 143, 144, 145, the gear 45 being mounted on the shaft 44 which carries the cam disc 40 for opening the grippers of the two chains of the lower transverse conveyer (FIGURES 11 and 12 show the corresponding shaft of the upper transverse conveyer). The rotation of gear 45 on the lower shaft 44 is transmitted to the gear 45 on the upper shaft 44 by means of three idler gears 146, 147, 148. The gear 45 at the other end of the lower transverse conveyer, which causes the grippers to be opened at the output end of the conveyer so as to free the tubular sections, is driven by gear 142 via gearing 149, 150, 151. The corresponding gear 45 of the upper transverse conveyer is driven by gear 142 via gearing 152, 153, 154. All four gears 45 are rotated continuously in synchronism with the operating cycles of the machine.

The gears 16, 17 (FIGURE 7) which drive the sprocket wheels 14, 15 are rotated intermittently by means of Geneva gearing. The gear 142 constitutes the actuator and carries on each side a driving pin 160 which cooperates with radial grooves of gears 161, 162, respectively. These gears, in addition to their radial grooves which impart to them the Geneva gearing characteristic, are provided with conventional peripheral toothing so as to enable the gears 161, 162 to mesh with other conventional gears. Thus, gear 161 drives the gear 16 via an idler gear 163, while gear 162 drives the gear 17 via an idler gear 164.

When the gears 161, 162 are not being rotated by gear 142, rotation of the former is prevented by means of respective gears 165, each of which is non-rotatably mounted on one end of an arm 166 of a respective two-arm lever 167, 168. The gear 165 carried by lever 167 is, at the proper time, brought into engagement with gear 161, against the action of a spring 169, by means of a cam 170 which rotates together with gear 142, this cam engaging a follower carried at the end of the other arm of the lever 167. Similarly, the gear 165 carried by lever 168 is, at the proper time, brought into engagement with gear 161, against the action of another spring 169, by means of a cam 171 which also rotates together with gear 142, which cam engages a follower carried at the end of the other arm of lever 168. With the parts occupying the position shown in FIGURE 16, the driving pin 160 at the rear of gear 142 (as viewed in FIGURE 16) engages one of the grooves of gear 162 so that, at this particular moment, the lower transverse conveyer will be driven, while the upper transverse conveyer will be at a standstill due to the fact that the driving pin 160 located at the front side of gear 142, i.e., the side of gear 142 which is closest as viewed in FIGURE 16, is not in engagement with any of the radial grooves of gear 161.

Instead of a gear 165, the levers 167, 168 can carry any other type of element capable of engaging the toothed periphery of gears 161, 162, so as to prevent rotation thereof, such as a pawl.

Movable jaws 175 (FIG. 18) on the receiving cylinder 137 work together with the shell of this cylinder and thus form grippers for clamping the leading ends of the incoming bags. The movable jaw 175 of each gripper is fastened to a pivotable journalled axle 176. The movable jaw consists of three parts. The axles 176 are carried parallel to the receiving cylinder axle in bearings formed in or fixed to the receiving cylinder. They project beyond the receiving cylinder on both sides, having a lever 177, 178 respectively on each end. On the free end of lever 177 one end of a tension spring 179 under pre-load is fastened, the other end of which is affixed to a bolt 180 fastened to the receiving cylinder 137. This spring is keeping the movable jaw 175 in the gripping position. On the free end of lever 178 positioned on the other end of the axles 176 a roller 181 is provided, co-operating successively with fixed peripherical cams (not shown), which effect the opening of the grippers against the force of the spring 179, when the roller is running onto one cam, viz when gripping the bag, when freeing it for applying the bottom patch and when ultimately releasing the bag.

Each baffle for folding the triangular pockets back over the bottom comprises a guide rail 185, 186 respectively (FIG. 18) and a folding rod 187, 188 respectively, adjustable to various bag widths, and each fastened by a holding device 189 (FIG. 17) on a horizontal bar 190, fixed to the machine frame. The rods 187, 188 lift the triangular pockets of the bags transported by the receiving cylinder 137, rotating in the direction of the arrow 191, by their pointed front end and effect by their inclined position, as shown in FIG. 18, the folding of the triangular pockets round the outer edge of the guide rails 185, 186, under which the bags are passing. Whereas the front end of the guide rails is slightly inclined upwards to receive the bags underneath them, the rear end is tapered outwards, giving room for two pressing rollers 192 for pressing the triangular pocket against the bottom of the bag. Dots of adhesive, which have been deposited on the triangular pockets previously by the adhesive applicator device 182, and which paste the triangular pockets onto the bottom of the bag and avoid that the triangular pockets rebound after they have been released by the pressing rollers and folding rods. The pressing rollers 192 are fixed to a driven shaft 193 (means of driving not shown) and can be adjusted to various bag widths.

The bottom patching device 195 (FIG. 17) comprises a pair of draw rollers 196, 197, a transfer cylinder 198 and a pasting device 199. In the transfer cylinder 198 is located a knife 200, co-operating with a fixed knife 201, for the purpose of separating sections, i.e. the individual bottom patches, from the web 202, which is unwound from the parent reel 203 by means of a pair of draw rollers 196, 197. A section, separated from the web, is held during its transport with the transfer cylinder 198 by means of suction devices incorporated in its shell. During their transport with the transfer cylinder paste is applied to the outer surface of the patches and they are then pasted onto the bottoms of the bag with this surface.

Figure 17:
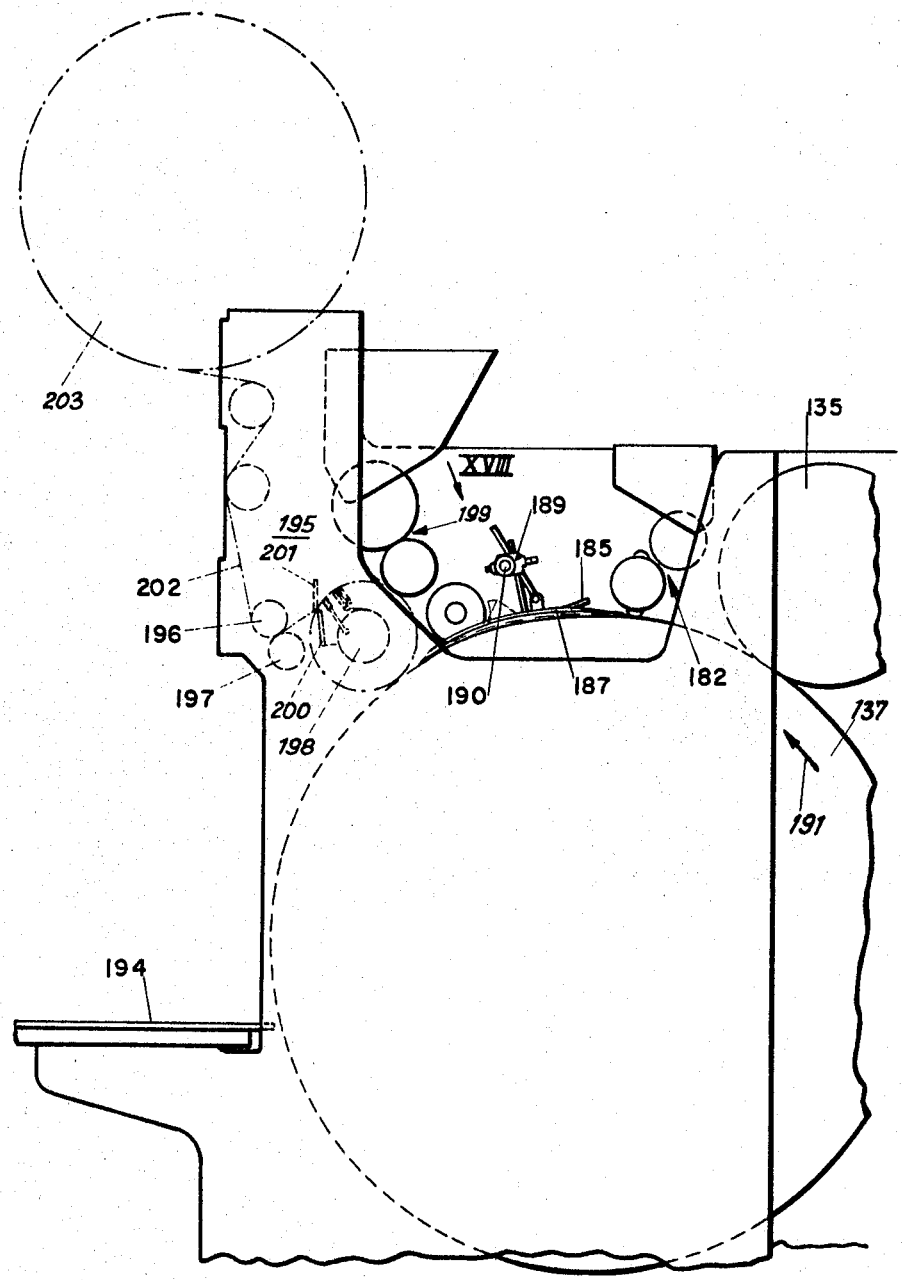
FIGURE 17 is a schematic side elevation view on an enlarged scale of the receiving cylinder and its cooperating stations.
Figure 18:
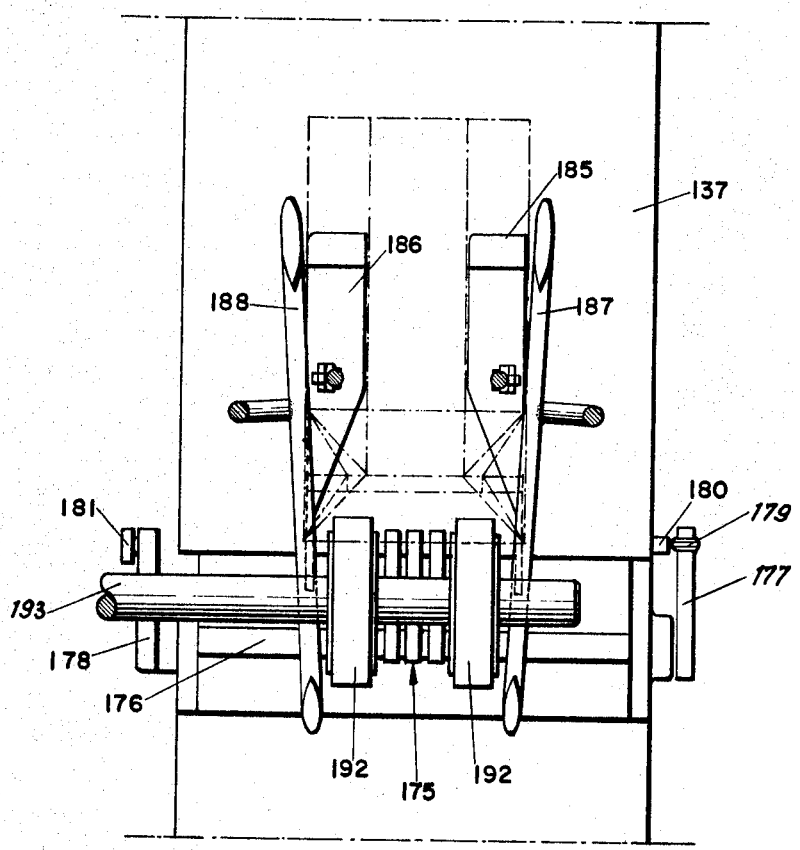
FIGURE 18 is a plan view in the direction of arrow XVIII of FIG. 17 showing the baffles for folding the triangular pockets.

Then the ready made bags are conveyed by the receiving cylinder 137 to a delivery point and after having been released by the grippers at this point they are positioned on the receiving table 194 (FIG. 17).

It will be understood that the above description of the present invention is susceptible to various modifications, changes, and adaptations, and the same are intended to be comprehended within the meaning and range of equivalents of the appended claims.

What is claimed is:

1. In a method of making the bottom on tubular sections which are folded flat and have inwardly directed longitudinal side folds, wherein a portion of such section equal in length to twice the depth of the side folds plus the desired width of the bottom seam is made into a folded block-shaped bottom, wherein the resulting corner pleats are then raised and spread toward and over the side edges of the section so that the edges of the bottom opening lie against each other and stand upright with respect to the remainder of the section, wherein the last-mentioned edges are then joined together to form the bottom seam, and wherein the bottom seam is then folded upon the bottom, the improvement that after the sections have had their block-shaped bottom folded and before the corner pleats are raised and spread, the direction of movement of the sections is changed from longitudinal to transverse movement.

2. In a method of making the bottom on tubular sections which are folded flat and have inwardly directed longitudinal side folds, the steps of:
   (a) moving each section in longitudinal direction and, during such longitudinal movement, making a portion of the section equal in length to twice the depth of the side folds plus the desired width of the bottom seam into a bottom which has corner pleats and which is prospectively block-shaped; and
   (b) thereafter moving the section in transverse direction and, during such transverse movement, raising the corner pleats and spreading the same toward and over the side edges of the section so that the edges of the bottom opening lie against each other and stand upright with respect to the remainder of the section.

3. A method of making the bottom on tubular sections which are folded flat and have inwardly directed longitudinal side folds, said method comprising the steps of:
   (a) moving each section in longitudinal direction and, during such longitudinal movement, making a portion of the section equal in length to twice the depth of the side folds plus the desired width of the bottom seam into a bottom which has corner pleats and which is prospectively block-shaped;
   (b) thereafter moving the section in transverse direction and, during such transverse movement, raising the corner pleats and spreading the same toward and over the side edges of the section so that the edges of the bottom opening lie against each other and stand upright with respect to the remainder of the section;
   (c) still during such transverse movement, joining said side edges together to form the bottom seam; and
   (d) folding the bottom seam onto the bottom.

4. The method defined in claim 3 wherein the longitudinal movement is continuous and the transverse movement is intermittent, the raising and spreading during step (b) and the joining during step (c) being carried out while the section is at rest.

5. A method as defined in claim 4 wherein alternate ones of sections which have been treated during step (a) are thereafter fed to at least two paths along each of which said steps (b) and (c) are carried out.

6. A method of making the bottom on tubular sections which are folded flat and have inwardly directed longitudinal side folds, said method comprising the steps of:
   (a) moving each section in longitudinal direction and, during such longitudinal movement, making a portion of the section equal in length to twice the depth of the side folds plus the desired width of the bottom seam into a bottom which has corner pleats and which is prospectively block-shaped;

(b) thereafter moving the section in transverse direction and, during such transverse movement, raising the corner pleats and spreading the same toward and over the side edges of the section so that the edges of the bottom opening lie against each other and stand upright with respect to the remainder of the section;

(c) still during such transverse movement, joining said side edges together to form the bottom seam; and (d) at the end of said transverse movement, folding the bottom seam onto the bottom.

7. The method defined in claim 6 wherein the longitudinal movement during step (a) is continuous, wherein the transverse movement during steps (b) and (c) is intermittent, the raising and spreading during step (b) and the joining during step (c) being carried out while the section is at rest, and wherein the folding during step (d) is carried out after the section has been moved transversely for the last time.

8. The method defined in claim 6 wherein, during step (d), the bottom seam is folded onto the bottom in the direction in which the section, upon completion of step (d), will travel.

9. A method as defined in claim 6 wherein alternate ones of sections which have been treated during step (a) are thereafter fed to two paths along each of which said steps (b), (c) and (d) are carried out.

10. A method as defined in claim 9 wherein the sections treated along said two paths are, subsequent to step (d), moved along a common path in longitudinal direction.

11. A method as defined in claim 10 wherein, during step (b), triangular pockets are formed which project beyond the sides of the section and wherein the method comprises the further step of:

(e) folding the triangular pockets onto the bottom and joining them thereto while the section is travelling along said common path in longitudinal direction.

12. A method of making the bottom on tubular sections which are folded flat and have inwardly directed longitudinal side folds, said method comprising the steps of:

(a) moving each section, at a continuous rate, in the direction of its own length and, during such longitudinal movement, making a portion of the section equal in length to twice the depth of the side folds plus the desired width of the bottom into a bottom which has corner pleats and which, upon ultimate completion thereof, will be block-shaped;

(b) thereafter feeding alternate ones of the sections treated in step (a) to two different work paths at each of which a section fed therealong (1) is moved intermittently in a direction which is transverse to the length of the section and, during a time interval at which the section is at rest, has its corner pleats raised and spread toward and over the side edges of the section so that the edges of the bottom opening lie against each other and stand upright with respect to the remainder of the section and so that triangular pockets are formed which project beyond the sides of the section, (2) is thereafter still moved intermittently in said transverse direction and, during another time interval at which the section is again at rest, has its bottom edges joined together to form the bottom seam, and (3) after the section has come to rest after having been moved in transverse direction for the last time, has its bottom seam folded onto the bottom in the direction in which the section is thereafter to move; and (c) thereafter moving the sections treated in said two paths along a common path at a continuous rate in longitudinal direction and, during such continuous longitudinal movement, folding the triangular pockets onto the bottom and joining them thereto.

13. In a bottom making machine, the combination which comprises:

(a) first conveyer means for conveying in longitudinal direction tubular sections having a folded block-shaped bottom;

(b) second conveyor means for picking up sections conveyed by said first conveyer means and conveying them in transverse direction; and (c) means arranged along the path at which said second conveyer means convey the sections for re-opening the folded bottom, for spreading the same, and for making the bottom seam.

14. In a bottom making machine, the combination which comprises:

(a) first conveyer means for conveying, at a continuous rate, tubular sections having a folded block-shaped bottom;

(b) second conveyer means for picking up sections conveyed by said first conveyer means and conveying them in a stepwise manner; and (c) means arranged along the path at which said second conveyer means convey the sections for re-opening the folded bottom, for spreading the same, and for making the bottom seam, said last-mentioned means being operative during time intervals the respective tube sections being operated on are at rest.

15. In a bottom making machine, the combination which comprises:

(a) first conveyer means for conveying, in longitudinal direction and at a continuous rate, tubular sections having a folded block-shaped bottom;

(b) second conveyer means for picking up sections conveyed by said first conveyer means and conveying them, in an intermittent manner, in traverse direction; and (c) means arranged along the path at which said second conveyer means convey the sections for re-opening the folded bottom, for spreading the same, and for making the bottom seam, said last-mentioned means being operative during time intervals when the respective tube sections being operated on are at rest.

16. In a bottom making machine, the combination which comprises:

(a) first conveyer means for conveying in longitudinal direction tubular sections having a folded block-shaped bottom;

(b) stop means for halting oncoming sections delivered by said first conveyer means;

(c) second conveyer means extending transverse to said longitudinal conveyer means, said transverse conveyer means having means for gripping sections halted by said stop means and for moving them in transverse direction; and (d) means arranged along the path at which said transverse conveyer means convey the sections for re-opening the folded bottom, for spreading the same, and for making the bottom seam.

17. The combination defined in claim 16 wherein said second conveyer means comprise a pair of endless chains carrying said gripping means, wherein said first conveyer means comprise at least one pair of cooperating endless upper and lower belts which engage the longitudinally moving sections on their upper and lower surfaces, respectively, said belts extending past the pick-up point of said chains of said second conveyer means and to said stop means, wherein said upper belt is run about rollers, and wherein means are provided for lifting said rollers so as to release the sections from between said two belts, said lifting means being synchronized with the closing of said gripping means.

18. The combination defined in claim 17 wherein said stop means comprise a bifurcated element having two arms, said element being mounted on the machine for pivotal movement about a horizontal axis which is transverse to said longitudinal direction, and each of said arms carrying at its free end a pin engageable by the oncoming sections conveyed by said first conveyer means.

19. The combination defined in claim 18 wherein said bifurcated element is adjustable in the longitudinal direction of the sections.

20. The combination as defined in claim 18 wherein said rollers about which said upper belt is run are carried at the free end of a lever and the latter is mounted for pivotal movement about the same pivot axis as said bifurcated element, said element and said lever being mounted on a common shaft so that said lever and said bifurcated element pivot together, the combination further comprising camming means for controlling the pivoting of said common shaft.

21. The combination defined in claim 16 further comprising means for driving said chains of said second conveyor means intermittently.

22. The combination defined in claim 21 wherein said drive means comprise Geneva gearing which is driven by a drive for the machine and which drives said chains.

23. The combination defined in claim 21 wherein said second conveyer means comprise chains carrying said gripping means, wherein said gripping means are normally closed, and wherein means are provided for opening them at given time intervals during which said second conveyer means are at rest.

24. The combination defined in claim 23 wherein said gripping means comprise two-armed grippers and wherein said gripper opening means comprise a link element connected to a free end of each gripper and camming means for controlling said link element.

25. The combination defined in claim 16 wherein said means for re-opening the folded bottom comprise a suction device having two suction elements each of which is eccentrically mounted for pivotal movement with a pivot axle turnably mounted in a lever which itself is turnable about a horizontal axis which is at right angles to said transverse direction, and means for adjusting the position of said last-mentioned lever.

26. The combination defined in claim 25 wherein said last-mentioned adjusting means comprise an adjusting handle fashioned as an indicator, and a stationary scale cooperating with said indicator.

27. The combination defined in claim 25 wherein each pivot axle carries a gear, each gear being in mesh with a toothed segment, the two toothed segments pertaining to said suction elements being in mesh with each other so that the two suction elements will carry out opposite movements, and means for periodically driving one of said toothed segments.

28. The combination defined in claim 27 wherein said gears are releasably attached to said pivot axles, and wherein said pivot axles carry hand-operable actuating means by means of which said pivot axles can be turned with respect to the gears.

29. The combination defined in claim 16 wherein said spreading means comprise: two spreaders, each spreader being carried by a link which itself is pivotally attached to two cranks, said cranks being mounted on a pair of crank gears, respectively, there being a driving gear for driving said pair of crank gears, said driving gear and said crank gears driven thereby being mounted on a common lever, the latter being mounted on a rotatable axle carrying toothed segments in mesh with said driving gear; and means for rotating the common levers and the toothed segments pertaining to said two spreaders, respectively, to produce similar but opposite element movement of said spreaders.

30. The combination defined in claim 29 wherein said common levers each carry a cam follower which is pressed against and cooperates with a respective one of two cam discs rotating continuously in synchronism with the operation of the machine, said common levers being rotatably mounted on their respective axles and said toothed segments being non-rotatably mounted thereon, said axles being connected, via a linkage system, with a cam follower roller which runs in a cam groove formed in a rotor connected with one of said cam discs for rotation therewith.

31. The combination defined in claim 29 wherein the point at which said link is pivotally attached to each respective crank is adjustable in a direction which is radial with respect to the crank gears on which said cranks are mounted.

32. The combination defined in claim 29 wherein said spreaders are movable in a given plane extending in said transverse direction and wherein said spreading means further comprise a neatening tool having two jaws arranged, respectively, on opposite sides of said plane, and means for moving said jaws of said neatening tool against the bottom of the section and upstanding edges thereof.

33. The combination defined in claim 32 wherein each neatening jaw has a U-shaped cross section and is carried at the end of a respective guide rod, the latter being slidably received in a sleeve which itself is pivotable about an axis which is parallel to said transverse direction.

34. The combination defined in claim 33 wherein each neatening jaw is pivotally connected to a lever which itself is non-rotatably mounted on a shaft which has its axis located on the side of said plane which is opposite to the side on which the respective neatening jaw is located.

35. The combination defined in claim 34 wherein said shafts are connected for simultaneous opposite rotation, and wherein one of said shafts carries an actuating lever having a cam follower cooperating with a control cam.

36. The combination defined in claim 16 wherein said means for making the bottom seam are located after said means for re-opening and spreading the bottom and comprise: continuously heated welding jaws, two hollow and coolable shafts carrying said welding jaws, respectively, two meshing toothed segments carried by said shafts, respectively, so that said jaws may be moved between open and closed positions, means for biasing said jaws to their open position, a lever connected to one of said shafts, and camming means cooperating with said lever for closing said jaws against the action of said biasing means.

37. The combination defined in claim 36 wherein said means for making the bottom seam include a loop-type regulator for controlling the welding temperature of said jaws.

38. The combination defined in claim 16, further comprising means arranged along said transverse path and past said means for making the bottom seam for transferring the section to longitudinally running conveyer belts.

39. The combination defined in claim 38 wherein said transfer means comprise a rotating cylinder segment and a resiliently supported counter roller between which segment and counter roller the section is gripped.

40. The combination defined in claim 39 wherein said cylinder segment is provided with a leading edge having a recess within which the bottom seam is received and folded over onto the bottom.

41. The combination defined in claim 39, further comprising means for holding sections between the instant said gripping means of said transverse conveyer means cease to grip the sections and the instant at which said transfer means commence to grip the sections.

42. The combination defined in claim 38 wherein said longitudinally running conveyer belts feed the section past means for applying adhesive to corner pockets of the sections, for folding the corner pockets onto the bottom, for applying a bottom patch to the bottom, and stacking the finished bags.

43. The combination defined in claim 16 wherein said first conveyer means deliver sections alternately to two superposed upper and lower levels, and wherein there are two stop means, two transverse conveyer means and two re-opening, spreading and bottom seam making means, one of each being located at a respective one of said levels.

44. The combination defined in claim 43 wherein said first conveyer means comprise a delivery cylinder and two directing cylinders which take alternate ones of the sections being delivered by said delivery cylinder and direct them toward said upper and lower stop means, respectively.

45. The combination defined in claim 43, further comprising two transfer cylinders for transferring sections from the upper and lower transverse paths and feeding them to a common receiving cylinder, the latter moving the sections, previously processed in both transverse feed paths, along a single path means for applying adhesive to corner pockets of the sections, for folding the corner pockets onto the bottom, and for applying a bottom patch to the bottom.

46. The combination defined in claim 43, further comprising means for intermittently driving said two transverse conveyer means, said drive means comprising two Geneva gears for driving said upper and lower transverse conveyer means and a Geneva gear actuator cooperating with both of said Geneva gears.

47. The combination defined in claim 46 wherein said Geneva gears are provided with radial grooves, and wherein said Geneva gear actuator comprises a gear having two drive pins located on opposite faces of said actuator and cooperating with the radial grooves of said two Geneva gears, respectively.

48. The combination defined in claim 47 wherein each Geneva gear is provided with peripheral toothing, and wherein said drive means further comprise two pivotally mounted two-armed levers each of which is associated with a respective one of said Geneva gears, each lever carrying at one end an element adapted to engage the peripheral toothing of the respective Geneva gear for preventing rotation thereof and at the other end a cam follower cooperating with camming means which are non-rotatably connected with said Geneva gear actuator, said camming means pivoting each respective two-armed lever to cause the element carried thereby to engage the peripheral toothing of the respective Geneva gear when the latter is not being rotated by said Geneva gear actuator.

49. The combination defined in claim 48 wherein said element is a gear non-rotatably mounted on the respective two-armed lever.

References Cited by the Examiner

UNITED STATES PATENTS 1,926,421 9/1933 Andreas _____ 93—14
2,773,435 12/1956 Richens _____ 93—22

BERNARD STICKNEY, *Primary Examiner.*